US007171476B2

(12) United States Patent
Maeda et al.

(10) Patent No.: US 7,171,476 B2
(45) Date of Patent: Jan. 30, 2007

(54) PROTOCOL AND STRUCTURE FOR SELF-ORGANIZING NETWORK

(75) Inventors: Masahiro Maeda, Tokyo (JP); Monique Bourgeois, Plantation, FL (US); Edgar H. Callaway, Jr., Boca Raton, FL (US); Priscilla Chen, Sunrise, FL (US); Jian Huang, Coral Springs, FL (US); Yan Huang, Plantation, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 234 days.

(21) Appl. No.: 10/125,939

(22) Filed: Apr. 19, 2002

(65) Prior Publication Data

US 2004/0003111 A1 Jan. 1, 2004

Related U.S. Application Data

(60) Provisional application No. 60/285,165, filed on Apr. 20, 2001.

(51) Int. Cl.
*G06F 15/16* (2006.01)
*H04L 12/28* (2006.01)

(52) U.S. Cl. .................. 709/227; 370/254; 370/400

(58) Field of Classification Search ........ 709/220–223, 709/237, 252, 227; 370/389, 230, 254, 256, 370/328, 400, 408
See application file for complete search history.

(56) References Cited

U.S. PATENT DOCUMENTS

| 4,313,036 A | | 1/1982 | Jabara et al. |
| 5,079,767 A | * | 1/1992 | Perlman ..................... 370/408 |
| 5,128,938 A | | 7/1992 | Borras |
| 5,241,542 A | | 8/1993 | Natarajan et al. |

(Continued)

OTHER PUBLICATIONS

Boukerche, A.; "A simulation based study of on-demand routing protocols for ad hoc wireless networks" Simulation Symposium, 2001. Proceedings. 34th Annual , Apr. 22-26, 2001 pp. 85-92.*

(Continued)

*Primary Examiner*—Paul H. Kang

(57) ABSTRACT

A cluster tree network formed by self-organization of a number of nodes. The method of self-organization includes processes for cluster formation, cluster network maintenance, intra-cluster communication. In the cluster formation process, each node discovers if any neighboring node is a cluster head or if any node is already a member of a cluster (thus making it a networked node), and if a cluster head or a networked node is discovered, each node establishes a communication link with the cluster head or the networked node. If no cluster head or networked node is discovered, the node itself becomes a cluster head. The network is maintained by each node periodically broadcasting a HELLO message to neighboring nodes, receiving responses to the HELLO message and updating a neighbor list in accordance with responses to the HELLO message. Multi-cluster networks are also provided using the processes of inter-cluster network formation, inter-cluster network maintenance, and inter-cluster communication. The resulting network has one or more clusters of nodes, each with a cluster head and a number of member nodes, each assigned a node identifier by the cluster head. In a multi-cluster network, a designated device assigns identifies to each cluster head in the network. Border nodes, which are members of at least two clusters, act as routers connecting the clusters and relaying information packets between the clusters.

51 Claims, 16 Drawing Sheets

U.S. PATENT DOCUMENTS

| | | | |
|---|---|---|---|
| 5,278,831 | A | 1/1994 | Mabey et al. |
| 5,371,734 | A | 12/1994 | Fischer |
| 5,418,835 | A | 5/1995 | Frohman et al. |
| 5,533,100 | A | 7/1996 | Bass et al. |
| 5,590,396 | A | 12/1996 | Henry |
| 5,740,366 | A | 4/1998 | Mahany et al. |
| 5,778,052 | A | 7/1998 | Rubin et al. |
| 5,797,094 | A | 8/1998 | Houde et al. |
| 5,845,204 | A | 12/1998 | Chapman et al. |
| 5,850,592 | A * | 12/1998 | Ramanathan ............... 455/7 |
| 5,940,771 | A | 8/1999 | Gollnick et al. |
| 5,943,397 | A | 8/1999 | Gabin et al. |
| 5,991,287 | A | 11/1999 | Diepstraten et al. |
| 6,044,069 | A | 3/2000 | Wan |
| 6,047,200 | A | 4/2000 | Gibbons et al. |
| 6,055,561 | A | 4/2000 | Feldman et al. |
| 6,058,289 | A | 5/2000 | Gardner et al. |
| 6,134,599 | A * | 10/2000 | Chiu et al. ............... 709/252 |
| 6,138,019 | A | 10/2000 | Trompower et al. |
| 6,192,230 | B1 | 2/2001 | van Bokhorst et al. |
| 6,205,122 | B1 * | 3/2001 | Sharon et al. ............ 370/254 |
| 6,208,623 | B1 * | 3/2001 | Rochberger et al. ....... 370/254 |
| 6,259,772 | B1 | 7/2001 | Stephens et al. |
| 6,269,404 | B1 | 7/2001 | Hart et al. |
| 6,285,892 | B1 | 9/2001 | Hulyalkar |
| 6,304,556 | B1 * | 10/2001 | Haas ....................... 370/254 |
| 6,351,522 | B1 | 2/2002 | Vitikainen |
| 6,356,538 | B1 | 3/2002 | Lin |
| 6,370,146 | B1 | 4/2002 | Higgins et al. |
| 6,377,987 | B1 * | 4/2002 | Kracht ..................... 709/220 |
| 6,385,174 | B1 | 5/2002 | Lin |
| 6,385,201 | B1 * | 5/2002 | Iwata ...................... 370/400 |
| 6,418,299 | B1 * | 7/2002 | Ramanathan ............... 455/7 |
| 6,456,599 | B1 * | 9/2002 | Elliott ..................... 370/254 |
| 6,457,048 | B2 * | 9/2002 | Sondur et al. ............ 709/220 |
| 6,473,408 | B1 | 10/2002 | Rochberger et al. |
| 6,493,759 | B1 * | 12/2002 | Passman et al. ........... 709/227 |
| 6,636,499 | B1 * | 10/2003 | Dowling ................... 370/338 |
| 6,694,361 | B1 * | 2/2004 | Shah et al. ............... 709/222 |
| 6,791,949 | B1 | 9/2004 | Ryu et al. |
| 6,816,460 | B1 | 11/2004 | Ahmed et al. |
| 6,829,222 | B2 * | 12/2004 | Amis et al. ............... 370/256 |
| 6,836,463 | B2 | 12/2004 | Garcia-Luna-Aceves et al. |
| 6,845,091 | B2 | 1/2005 | Ogier et al. |
| 6,876,643 | B1 * | 4/2005 | Aggarwal et al. .......... 370/254 |
| 6,889,254 | B1 | 5/2005 | Chandra et al. |
| 6,973,053 | B1 * | 12/2005 | Passman et al. ........... 709/227 |
| 6,982,960 | B2 | 1/2006 | Lee et al. |
| 2002/0018448 | A1 * | 2/2002 | Amis et al. ............... 709/220 |
| 2002/0031131 | A1 | 3/2002 | Yemini et al. |
| 2002/0169846 | A1 * | 11/2002 | Chen et al. ............... 709/209 |

OTHER PUBLICATIONS

Whay C. Lee, "Topology Aggregation for Hierarchical Routing in ATM Networks", Computer Communication Review, vol. 25, No. 2, Apr. 1995, pp. 82-92, ACM Press.*

Hoon Oh; Hong Seong Park; "Communication architecture and protocols for broadcast-type mobile multimedia ad hoc networks" MILCOM 2002. Proceedings vol. 1, Oct. 7-10, 2002 pp. 442-447 vol. 1.*

Chatterjee, M.; Sas, S.K.; Turgut, D.; "An on-demand weighted clustering algorithm (WCA) for ad hoc networks" Global Telecommunications Conference, 2000. GLOBECOM '00. IEEE vol. 3, Nov. 27-Dec. 1, 2000 pp. 1697-1701 vol. 3.*

Ivan Stojmenovic; Nejib Zaguia; "Bluetooth scatternet formation in ad hoc wireless networks" Retrieved from http://www.site.uottawa.ca/~ivan/BSF-survey.pdf on May 20, 2005.*

Jiandong, L. et al.; "An adaptive cluster algorithm for a self-organizaing communication network", Confernence Record of the Global Telecommunications Conference and Exhibition, 1988 (GLOBECOM '88); Nov. 1988; pp. 1653-1656 vol. 3.*

Lin, Hwa-Chun et al.; "A clustering technique for large multihop mobile wireless networks", IEEE 51st Vehicular Technology Conference Proceedings, 2000; May 2000; pp. 1545-1549 vol. 2.*

Yong-xin, F.; "A clustering algorithm applied to the network management on mobile ad hoc network", Proceedings of the International Conferences on Info-tech and Info-net, 2001; Oct. 2001; pp. 626-631 vol. 2.*

Gerla et al., "Multicluster, Moble, Multimedia Radio Network", Wireless Networks 1 (1995) 255-265.

"Mediation Device Operation", Qicai Shi, Ed Callaway, Document IEEE 802.15-01/1188rl.

* cited by examiner

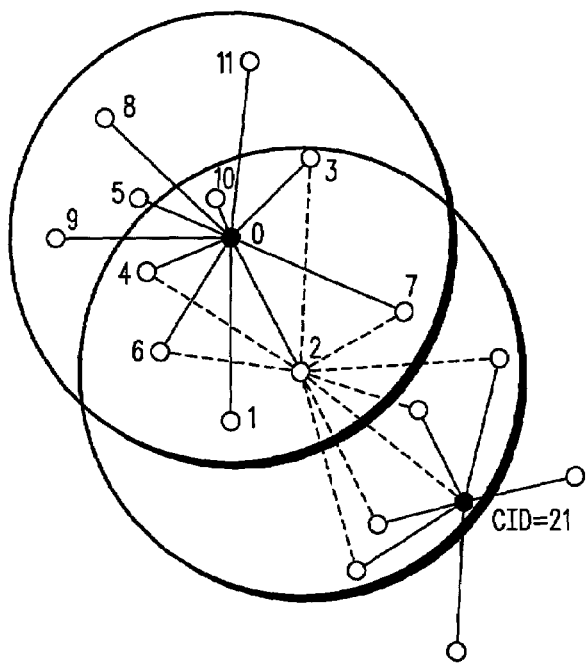
FIG. 7
```
NEIGHBOR LIST
 OF NODE 2
     0
     1
     2
     3
     4
     5
     6
     6
    10
  CID 21
```
FIG. 8
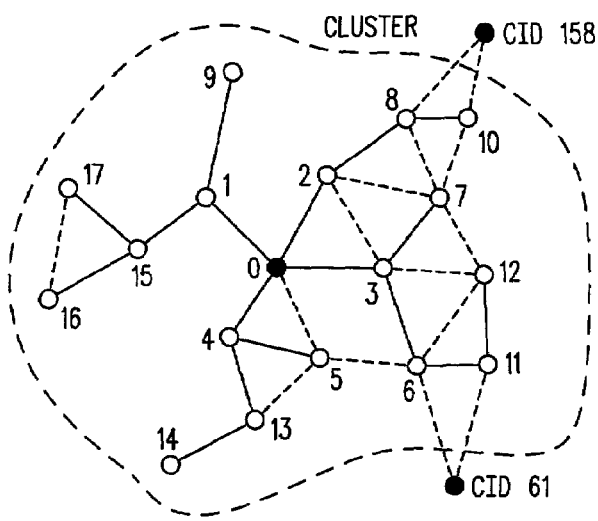
FIG. 9
```
SENDER    LINK-STATE REPORT
NODE 1    0,9,15
NODE 2    0,3,7,8
NODE 3    0,2,6,7,12
NODE 4    0,5,13
NODE 5    0,4,6,13
NODE 6    3,5,11,12, CID61
NODE 7    2,3,8,10,12
NODE 8    2,7,10, CID158
NODE 9    1
NODE 10   7,8, CID158
NODE 11   6,12, CID61
NODE 12   3,6,7,11
NODE 13   4,5,14
NODE 14   13
NODE 15   1,16,17
NODE 16   15,17
NODE 17   15,16
```
FIG. 10

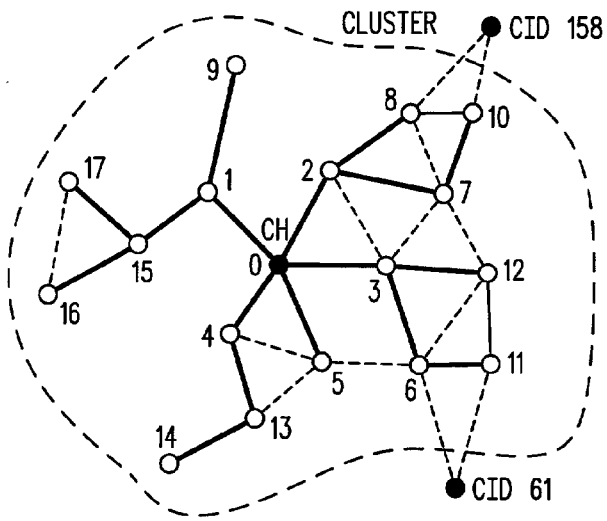
*FIG. 11*
| TOPOLOGY UPDATE | |
|---|---|
| NODE | PARENT NODE |
| NODE 1 | 0 |
| NODE 2 | 0 |
| NODE 3 | 0 |
| NODE 4 | 0 |
| NODE 5 | 0 |
| NODE 6 | 3 |
| NODE 7 | 2 |
| NODE 8 | 2 |
| NODE 9 | 1 |
| NODE 10 | 7 |
| NODE 11 | 6 |
| NODE 12 | 3 |
| NODE 13 | 4 |
| NODE 14 | 13 |
| NODE 15 | 1 |
| NODE 16 | 15 |
| NODE 17 | 15 |
| *CID61* | 6 |
| *CID158* | 8 |
*FIG. 12*
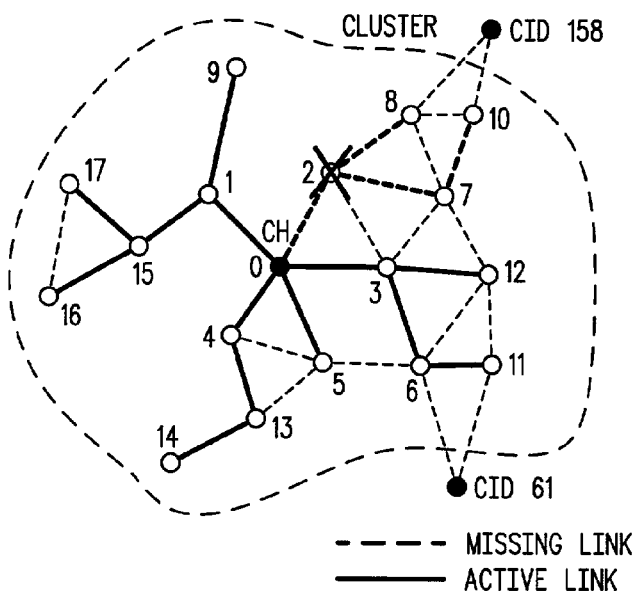
--- MISSING LINK
— ACTIVE LINK
*FIG. 13*
| SENDER | LINK-STATE REPORT |
|---|---|
| NODE 1 | 0,9,15 |
| ~~NODE 2~~ | ~~0,3,7,8~~ |
| NODE 3 | 0,2,6,7,12 |
| NODE 4 | 0,5,13 |
| NODE 5 | 0,4,6,13 |
| NODE 6 | 3,5,11,12, *CID61* |
| ~~NODE 7~~ | ~~2,3,8,10,12~~ |
| ~~NODE 8~~ | ~~2,7,10, *CID158*~~ |
| NODE 9 | 1 |
| ~~NODE 10~~ | ~~7,8, *CID158*~~ |
| NODE 11 | 6,12, *CID61* |
| NODE 12 | 3,6,7,11 |
| NODE 13 | 4,5,14 |
| NODE 14 | 13 |
| NODE 15 | 1,16,17 |
| NODE 16 | 15,17 |
| NODE 17 | 15,16 |
*FIG. 14*

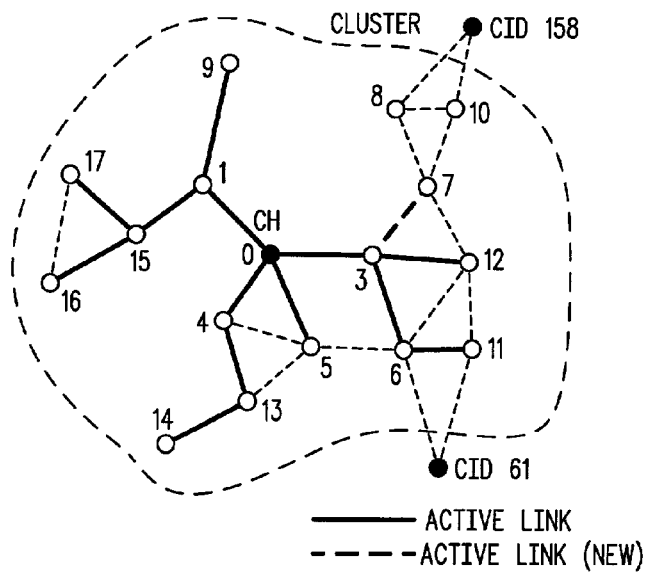
FIG. 15
| TOPOLOGY UPDATE | |
|---|---|
| NODE | PARENT NODE |
| NODE 1 | 0 |
| NODE 3 | 0 |
| NODE 4 | 0 |
| NODE 5 | 0 |
| NODE 6 | 3 |
| NODE 7 | 3 |
| NODE 9 | 1 |
| NODE 11 | 6 |
| NODE 12 | 3 |
| NODE 13 | 4 |
| NODE 14 | 13 |
| NODE 15 | 1 |
| NODE 16 | 15 |
| NODE 17 | 15 |
| CID61 | 6 |
FIG. 16
| SENDER | LINK-STATE REPORT |
|---|---|
| NODE 1 | 0,9,15 |
| NODE 3 | 0,6,7,12 |
| NODE 4 | 0,5,13 |
| NODE 5 | 0,4,6,13 |
| NODE 6 | 3,5,11,12, CID61 |
| NODE 7 | 3,8,10,12 |
| NODE 9 | 1 |
| NODE 11 | 6,12, CID61 |
| NODE 12 | 3,6,7,11 |
| NODE 13 | 4,5,14 |
| NODE 14 | 13 |
| NODE 15 | 1,16,17 |
| NODE 16 | 15,17 |
| NODE 17 | 15,16 |
FIG. 18
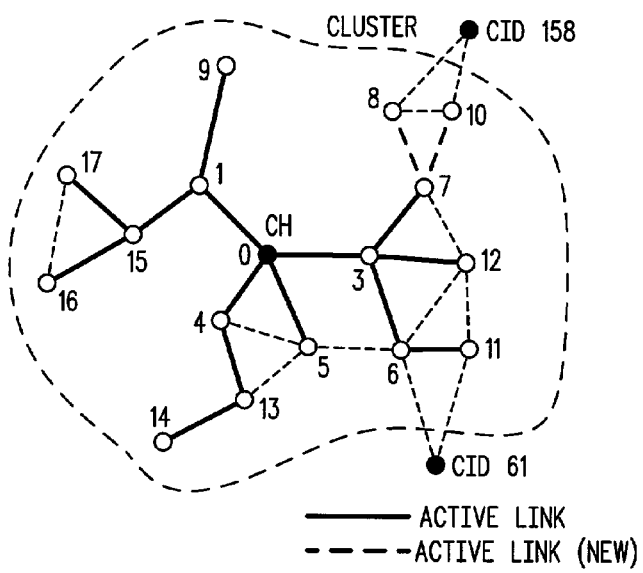
FIG. 17
| TOPOLOGY UPDATE | |
|---|---|
| NODE | PARENT NODE |
| NODE 1 | 0 |
| NODE 3 | 0 |
| NODE 4 | 0 |
| NODE 5 | 0 |
| NODE 6 | 3 |
| NODE 7 | 3 |
| NODE 8 | 7 |
| NODE 9 | 1 |
| NODE 10 | 7 |
| NODE 11 | 6 |
| NODE 12 | 13 |
| NODE 13 | 4 |
| NODE 14 | 13 |
| NODE 15 | 1 |
| NODE 16 | 15 |
| NODE 17 | 15 |
| CID61 | |
FIG. 19

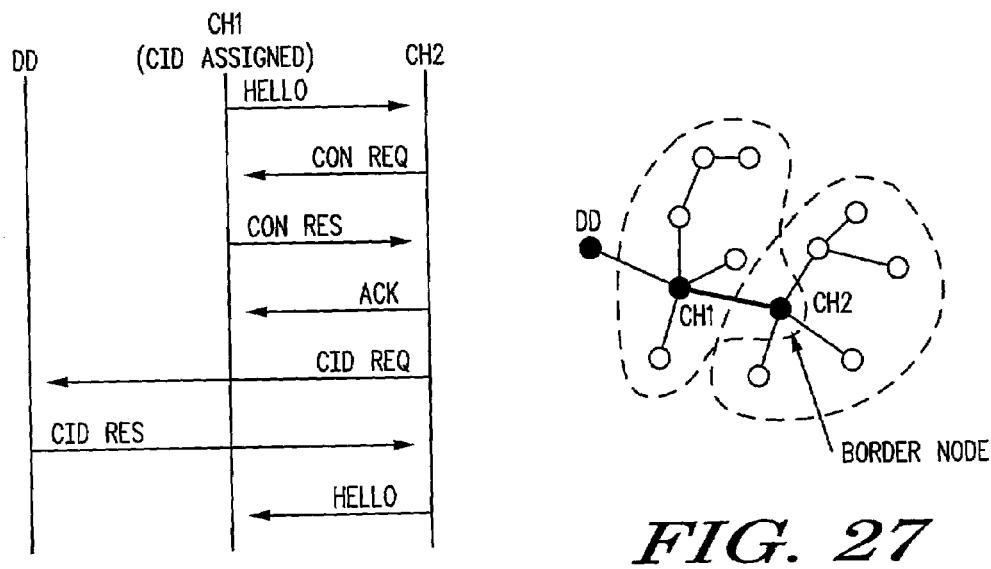
FIG. 26
FIG. 27
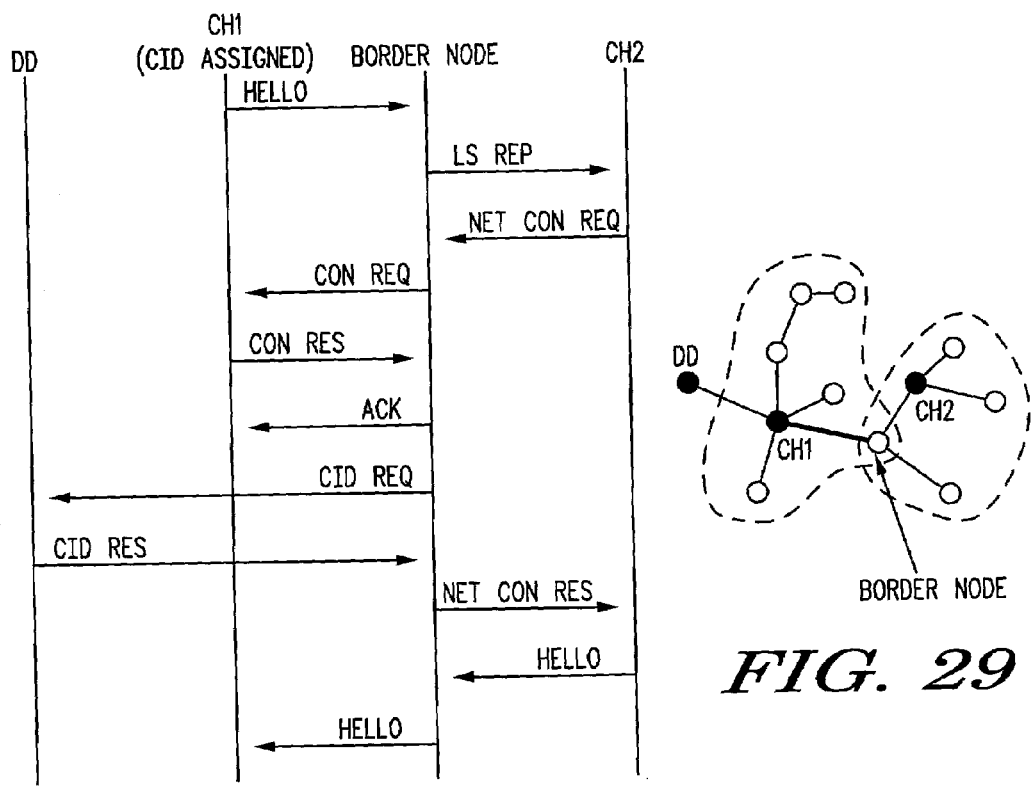
FIG. 28
FIG. 29

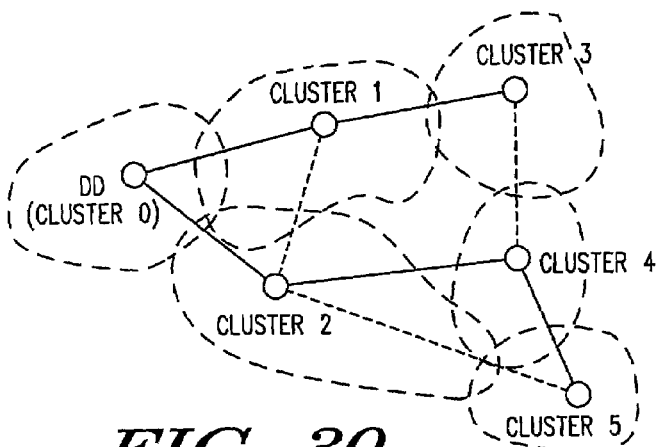

FIG. 30

NETWORK LINK-STATE REPORT

| CLUSTER 1 | 0,2,3 |
|---|---|
| CLUSTER 2 | 0,1,4,5 |
| CLUSTER 3 | 1,4 |
| CLUSTER 4 | 2,3,5 |
| CLUSTER 5 | 2,4 |

FIG. 31

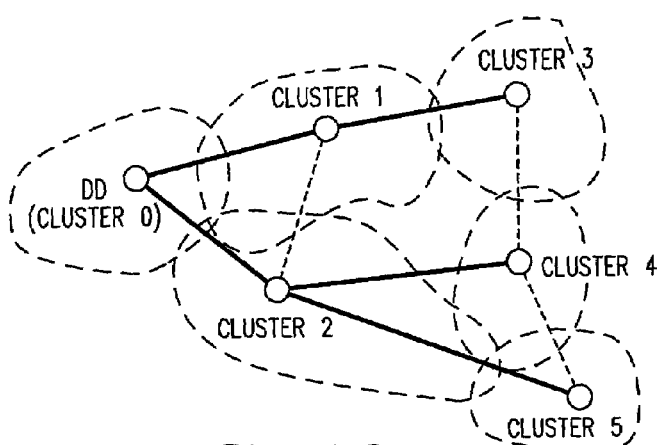

FIG. 32

NETWORK LINK-STATE REPORT

| CLUSTER | PARENT CLUSTER |
|---|---|
| CLUSTER 1 | 0 |
| CLUSTER 2 | 0 |
| CLUSTER 3 | 1 |
| CLUSTER 4 | 2 |
| CLUSTER 5 | 2 |

FIG. 33

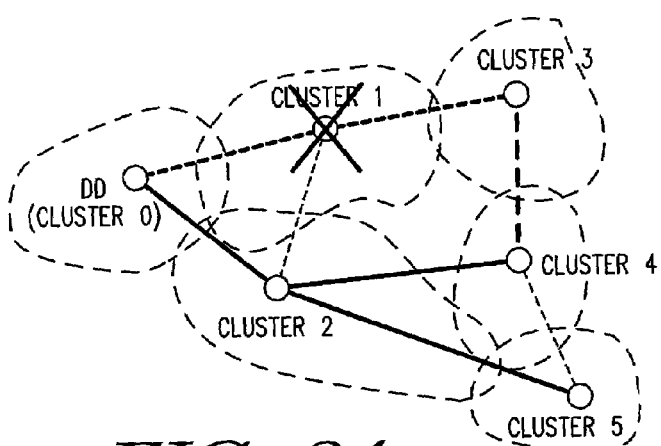

FIG. 34

NETWORK LINK-STATE REPORT

| CLUSTER | PARENT CLUSTER |
|---|---|
| ~~CLUSTER 1~~ | ~~0,2,3~~ |
| CLUSTER 2 | 0,1,4,5 |
| ~~CLUSTER 3~~ | ~~1,4~~ |
| CLUSTER 4 | 2,3,5 |
| CLUSTER 5 | 2,4 |

FIG. 35

NETWORK TOPOLOGY UPDATE

| CLUSTER | PARENT CLUSTER |
|---|---|
| ~~CLUSTER 1~~ | ~~0~~ |
| CLUSTER 2 | 0 |
| CLUSTER 3 | ~~1~~ 4 |
| CLUSTER 4 | 2 |
| CLUSTER 5 | 2 |

| CH DID | FRAME TYPE | RNID | Src NID | LENGTH 1 | LENGTH 2 | NID #1 | NID #2 | ... | NID #n | CID #1 | ... | CID #m |
|---|---|---|---|---|---|---|---|---|---|---|---|---|
| 6 bit | 8 bit | 8 bit | 8 bit | 8 bit | 8 bit | 8 bit | | | 8 bit | 8 bit | | 8 bit |

FIG. 46

| CH DID | FRAME TYPE | LENGTH 1 | LENGTH 2 | NID #1 | PARENT NID | ... | NID #n | PARENT NID | CID #1 | BORDER NID | ... | CID #m | BORDER NID |
|---|---|---|---|---|---|---|---|---|---|---|---|---|---|
| 6 bit | 8 bit | 8 bit | 8 bit | 8 bit | 8 bit | | 8 bit | 8 bit | 8 bit | 8 bit | | 8 bit | 8 bit |

FIG. 47

| CH DID | FRAME TYPE | RNID | Dst NID | CID |
|---|---|---|---|---|
| 6 bit | 8 bit | 8 bit | 8 bit | 8 bit |

| CH DID | FRAME TYPE | RNID | Dst CID | Dst NID | Src CID | Src NID |
|---|---|---|---|---|---|---|
| | 6 bit | 8 bit | 8 bit | 8 bit | 8 bit | 8 bit |

*FIG. 58*

| CH DID | FRAME TYPE | RNID | Dst NID | Src NID | PAYLOAD |
|---|---|---|---|---|---|
| | 6 bit | 8 bit | 8 bit | 8 bit | |

*FIG. 59*

| CH DID | FRAME TYPE | RNID | TNID | Dst CID | Dst NID | Src CID | Src NID | PAYLOAD |
|---|---|---|---|---|---|---|---|---|
| | 6 bit | 8 bit | 8 bit | 8 bit | 8 bit | 8 bit | 8 bit | |

*FIG. 60*

PROTOCOL AND STRUCTURE FOR SELF-ORGANIZING NETWORK

PRIORITY DATA

This application claims the benefit under Title 35, United States Code Section 119(e), to U.S. provisional application Ser. No. 60/285,165 filed Apr. 20, 2001.

CROSS REFERENCE TO RELATED APPLICATIONS

This application is related to U.S. patent application Ser. No. 09/803322 filed Mar. 9, 2001 titled "A Multiple Access Protocol and Structure for Communication Devices in an Asynchronous Network", Now U.S. Pat. No. 6,816,493, and to pending U.S. patent application Ser. No. 10/022935 filed Dec. 18, 2001 titled "A Multiple Access Protocol and Structure for Communication Devices in an Asynchronous Network" and currently pending, which are hereby incorporated herein by reference.

FIELD OF THE INVENTION

This invention relates generally to the field of communication networks. More particularly, the invention relates to a protocol and structure for a self-organizing network.

BACKGROUND OF THE INVENTION

There are many applications for wireless communication networks, such as wireless sensors, industrial control and monitoring, intelligent agriculture, asset and inventory tracking, and security. The manual configuration of such networks can be time consuming and expensive. There is therefore a need for a communication protocol that produces an ad hoc, self-organizing network; that is, a network with a random topology in which the network organization and maintenance occur without human intervention.

SUMMARY OF THE INVENTION

The present invention relates generally to self-organizing communication networks and in particular to structures and protocols for the operation of cluster tree self-organizing networks. Objects and features of the invention will become apparent to those of ordinary skill in the art upon consideration of the following detailed description of the invention.

The Cluster Tree Protocol of the present invention is a protocol of the logical link and network layers for a wireless ad-hoc network. In one embodiment, the protocol uses link-state packets to form either a single cluster network, or a potentially larger cluster tree network. The network is basically self-organized, and supports network redundancy to attain a degree of fault resistance and self-repair.

Nodes select a cluster head and form a cluster according to the self-organized manner. In the cluster formation process the cluster head assigns a unique node ID to each member node.

Self-developed clusters connect to each other using a Designated Device. The Designated Device is a special node that has high computing ability and large memory space; in most applications it is also the gateway between the network and the Internet. The Designated Device assigns a unique cluster ID to each cluster.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

FIG. 7 is a diagrammatic representation an exemplary network.

FIG. 8 is a neighbor list of a node in cluster border of the network shown in FIG. 7.

FIG. 9 is a diagrammatic representation an exemplary network.

FIG. 10 is a link-state report corresponding to the network in FIG. 9.

FIG. 11 is a diagrammatic representation an exemplary network.

FIG. 12 is a topology update table corresponding to the network in FIG. 11.

FIG. 13 is a diagrammatic representation of an exemplary network with a failed node.

FIG. 14 is a modified link-state report table for the network shown in FIG. 13.

FIG. 15 is a diagrammatic representation of the network in FIG. 13 following a first stage of link recovery.

FIG. 16 is a topology update table for the network shown in FIG. 15.

FIG. 17 is a diagrammatic representation of the network in FIG. 13 following a second stage of link recovery.

FIG. 18 is a link-state report table for the network shown in FIG. 17.

FIG. 19 is a topology update table for the network shown in FIG. 17.

FIG. 26 is an interaction diagram of a third example of cluster ID assignment.

FIG. 27 is a diagrammatic representation of a network corresponding to FIG. 26.

FIG. 28 is an interaction diagram of a fourth example of cluster ID assignment.

FIG. 29 is a diagrammatic representation of a network corresponding to FIG. 28.

FIG. 30 is an interaction diagram of an exemplary network.

FIG. 31 is a network link-state report corresponding to the network shown in FIG. 30.

FIG. 32 is a diagrammatic representation of an exemplary network.

FIG. 33 is a network topology update table corresponding to the network shown in FIG. 32.

FIG. 34 is a diagrammatic representation of an exemplary network illustrating network redundancy.

FIG. 35 is a modified network link-state report corresponding to the network shown in FIG. 34.

FIG. 36 is a modified network topology update table corresponding to the network shown in FIG. 34.

FIG. 45 shows the structure of an exemplary LINK-STATE REPORT message.

FIG. 46 shows the structure of an exemplary TOPOLOGY UPDATE

FIG. 47 shows the structure of an exemplary NETWORK CONNECTION REQUEST message.

FIG. 58 shows the structure of an exemplary ACKNOWLEDGEMENT (ACK) for Inter Cluster Communication.

FIG. 59 shows the structure of an exemplary Intra Cluster DATA frame.

FIG. 60 shows the structure of an exemplary Inter Cluster DATA frame.

DETAILED DESCRIPTION OF THE INVENTION

Figure 1:
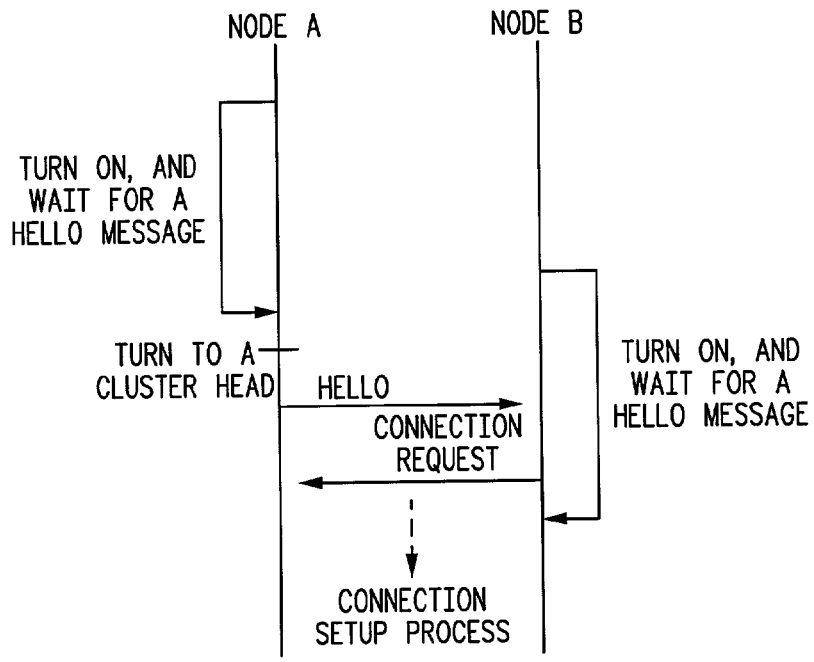
FIG. 1 is a diagrammatic representation of a cluster head selection process of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The Cluster Tree Protocol of the present invention is a protocol of the logical link and network layers for a wireless ad-hoc network. In one embodiment, the protocol uses link-state packets to form either a single cluster network, or a potentially larger cluster tree network. The network is basically self-organized, and supports network redundancy to attain a degree of fault resistance and self-repair.

Nodes select a cluster head and form a cluster according to the self-organized manner that will be described below. In the cluster formation process the cluster head assigns a unique node ID to each member node.

Self-developed clusters connect to each other using the Designated Device. The Designated Device is a special node that has high computing ability and large memory space; in some applications it is also the gateway between the network and the Internet. The Designated Device assigns a unique cluster ID to each cluster.

In the preferred embodiment, a network is made of one or more clusters, each cluster having a cluster head and a number of member nodes. The formation and operation of a single cluster is described first. Multi-cluster networks are described later. Each node is directed by a computer program stored in a memory, an application specific integrated circuit, a digital signal processor or an equivalent device. Each node has an input for receiving data and an output for transmitting data.

Single Cluster Network: Cluster Formation Process

The Cluster formation process begins with the selection of the cluster head, the first node in the cluster. After a cluster head is selected, the cluster head expands links with other member nodes to form a cluster.

One example of selecting a cluster head is illustrated in FIG. 1. After a node turns on, it operates as a regular network node, and listens and searches for a HELLO message from other nodes. (A HELLO message is a simple broadcast message identifying the transmitting node.) If the node does not receive any HELLO messages for a first period of time, e.g., 1–30 seconds, it then operates as a cluster head and sends out a HELLO message to its neighbors. The new cluster head waits for responses from neighboring nodes for a second period of time, e.g., 2–60 seconds. If no connection requests are received, the node turns back to operation as a regular network node and listens again.

Figure 2:
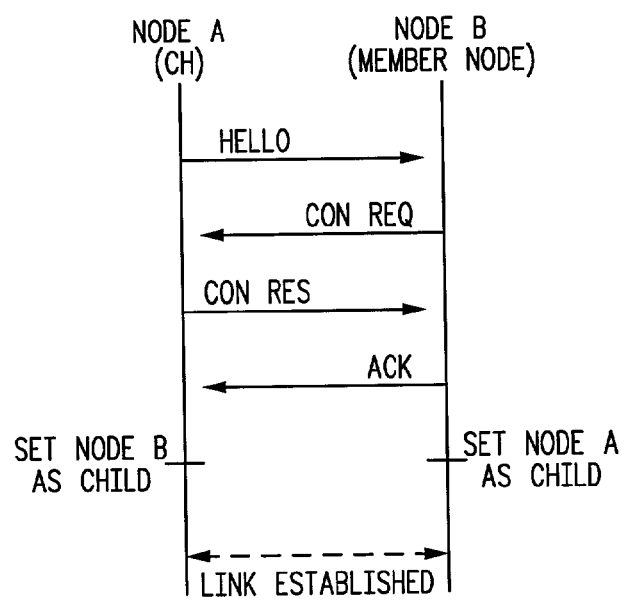
FIG. 2 is a diagrammatic representation of a link setup process between a cluster head and a member node in accordance with the invention.

Other methods to select a cluster head are possible. The cluster head can be selected based on stored/calculated parameters of each node, like transmission range, power capacity, computing ability or location information. After a node is selected as a cluster head (CH), it broadcasts a periodic HELLO message that contains a part of the cluster head MAC (Multiple Access Control) address and a node ID (0 for example) that indicates the cluster head. This is shown in FIG. 2. Referring now to FIG. 2, the nodes that receive this HELLO message send a CONNECTION REQUEST message to the cluster head. When the cluster head receives the CONNECTION REQUEST, it responds to the node with a CONNECTION RESPONSE message that contains a node ID for the node. The node ID should preferably be unique within a cluster and the cluster head has the responsibility to assign and manage unique node IDs to its member nodes. The node that is assigned a node ID replies with an ACK (acknowledge) message to the cluster head. After every message exchange is finished, both nodes set each other as parent or child. Each node maintains a neighbor list, which includes a list of parent and child nodes. Specifically, the cluster head denotes the newly added node as a child in its neighbor list and the new node denotes the cluster head as a parent. The link between the cluster head and the member node is established at this moment.

Figure 3:
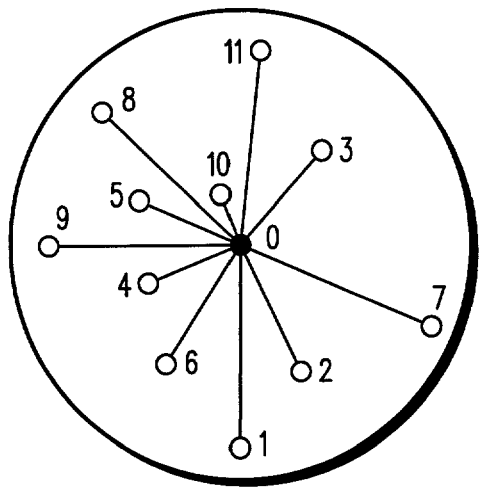
FIG. 3 is a diagrammatic representation of a single-hop cluster structure in accordance with the invention.

If all nodes are located in the range of the cluster head, the topology of connection becomes a star, as shown in FIG. 3, and every member node is connected to the cluster head with one hop. In the preferred embodiment, the maximum number of nodes in a cluster is 254 including the cluster head. If node addresses with N-bits are used the maximum number of nodes is $2^N-2$. The administrator or the manufacturer may limit the node feature to supporting only single hop cluster.

Figure 4:
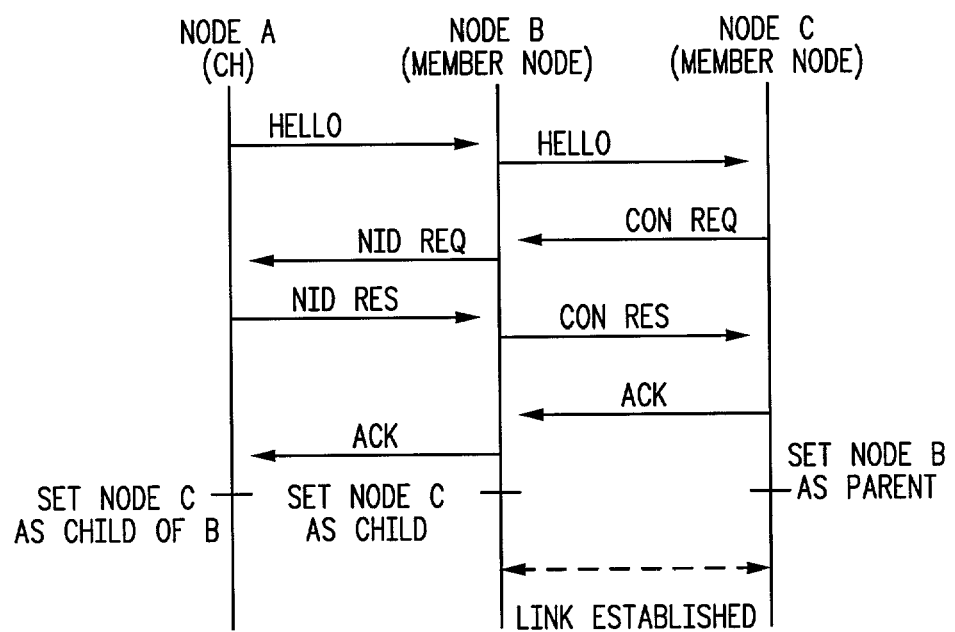
FIG. 4 is a diagrammatic representation of a multi-hop cluster setup procedure in accordance with the invention.

A cluster can expand into a multi-hop structure when each node supports multiple connections. Although network delay increases, the coverage within one cluster can increase. The multi hop cluster setup procedure is described in FIG. 4. After node B has established a link with the cluster head, it starts to relay HELLO messages from the cluster head. When node C gets the message from node B, it sends a CONNECTION REQUEST message to node B. Node B requests a new node ID to the cluster head for node C. When node B receives a new node ID from the cluster head, it sends a CONNECTION RESPONSE message to node C. Then node C receives it and answers with an ACK message. After this message exchange, node C sets node B as its parent, node B sets node C as its child, and the cluster head sets node C as node B's child. Node C then starts to relay HELLO messages to announce itself to its neighborhood.

When a node receives several HELLO messages from different nodes, there are many different ways to select the Hello message to which to respond. In a preferred embodiment, the node responds to the earliest HELLO message. In another embodiment, it responds to the strongest HELLO message. The path to the cluster head might not be ideal at this time. The route to the cluster head will optimize in a later process.

This expansion process can continue until the cluster head runs out of node IDs. The maximum hop count may also be limited to reduce maximum network delay.

When the cluster head has run out of node IDs or the cluster has reached some other defined limit, the cluster head should reject connection requests from new nodes. To reject the connection request, the temporary NID (NID 254 for example) is used in the destination NID field of the CONNECTION RESPONSE message or the new NID field of the NODE ID RESPONSE message.

When a requester node receives a NODE ID RESPONSE message with NID 254, it sends a CONNECTION RESPONSE message with NID 254 to the new node.

If a new node has received a CONNECTION RESPONSE with NID 254, it stores the cluster ID and stop sending a CONNECTION REQUEST message to the node belonging to the same cluster for a while.

Figure 5:
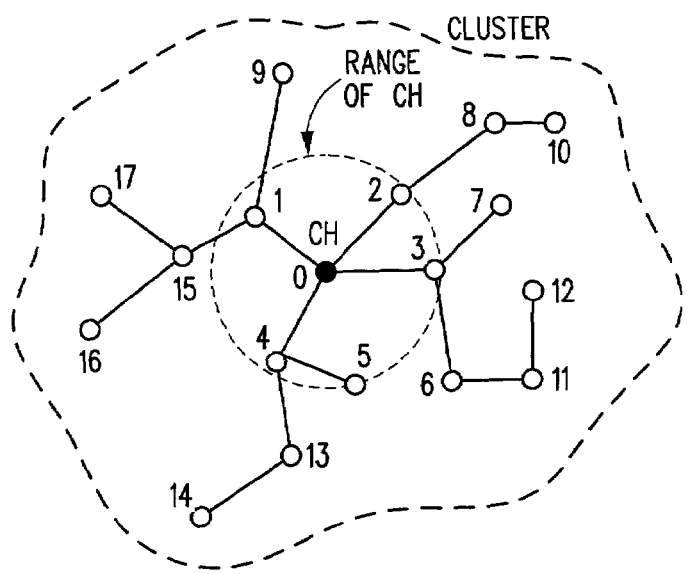
FIG. 5 is a diagrammatic representation of a multi-hop cluster structure in accordance with the invention.

An example of a multi-hop cluster structure is shown in FIG. 5.

Single Cluster Network: Network Maintenance

Figure 6:
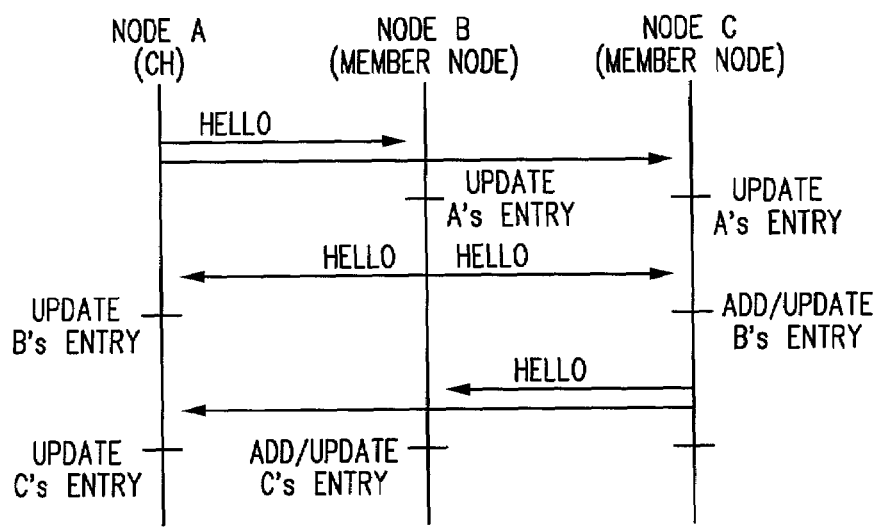
FIG. 6 is a diagrammatic representation of a process for updating a neighbor list in accordance with the invention.

The cluster head periodically broadcasts HELLO messages to its member nodes. When these member nodes receive the HELLO message from the cluster head, they also send HELLO messages to announce themselves to their neighbors. Every node records their neighbor nodes in their neighbor list. The entry of the neighbor list is updated by the periodic HELLO message. If a node entry doesn't update until certain timeout limit, it should be eliminated. This process is shown in FIG. 6.

The member nodes can talk directly with the neighbor nodes. If a node wants to communicate with a node outside of its range, it asks the cluster head or the parent node to relay the message to the destination.

A node may receive a HELLO message from a node that belongs to different cluster. In that case, the node adds the cluster ID (CID) of the transmitting node in the neighbor list. An exemplary network is shown in FIG. 7. The corresponding neighbor list for node 2 is shown in FIG. 8.

Every node has to report its link state to the cluster head. A member node periodically sends a LINK-STATE REPORT message that contain its neighbors node ID list to the cluster head. The frequency of Link-State Report message will be determined by application requirements and stability. FIG. 9 shows an exemplary network. A table of the link-state reports sent by each node is shown in FIG. 10.

Based on the LINK-STATE REPORT message the cluster head periodically calculates the shortest path between itself and member nodes and informs it to the members by TOPOLOGY UPDATE message. An example of a TOPOLOGY UPDATE report for the network shown in FIG. 11 is shown in FIG. 12.

The cluster head should choose the route with the smallest hop count. If there are several routes with the same hop count, the cluster head should choose the route that has the smallest node ID as the parent node or some similar arbitration rule.

If a member node receives the TOPOLOGY UPDATE message that the different parent node is linked to the node, it changes the parent node as indicated in the message. The member node also records its child nodes and the nodes below it in the tree at this time. The nodes within a cluster basically communicate with other node through the parent node except the case where they communicate with their neighbor nodes directly. The cycle of the Topology Update depends on the Link-State Report cycle.

If a member node has trouble and becomes unable to communicate, the tree route of the cluster would be reconfigured. In the cluster show in FIG. 13, the node 2 has trouble and stops communication. A modified table of corresponding link-state reports is shown in FIG. 14. Since the nodes 2, 7, 8 and 10 cannot send the LINK-STATE REPORT, the cluster head calculates a new route from other link-state information. By the first TOPOLOGY UPDATE message, the node 7 establishes a new connection with the node 3, as shown in FIG. 15. The corresponding topology update report is shown in FIG. 16. In the next cycle of TOPOLOGY REPORT and UPDATE, the nodes 8 and 10 are instructed to connect to node 7. The resulting network is shown in FIG. 17. The corresponding link-state report is shown in FIG. 18 and the corresponding topology update is shown in FIG. 19.

When the cluster head has trouble, the distribution of HELLO messages is stopped and all member nodes know that they have lost the cluster head. The member nodes lose their node ID and connections with the parent/children nodes. The cluster is then reconfigured in the same way as the cluster formation process.

Single Cluster Network: Intra Cluster Communication.

Figure 20:
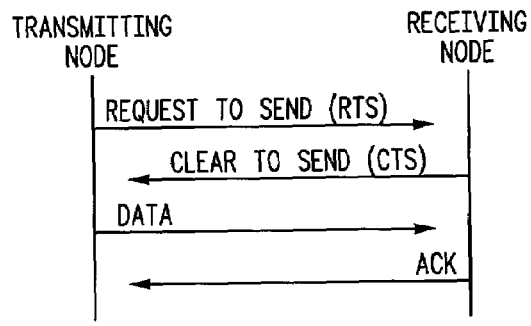
FIG. 20 is a diagrammatic representation of multiple access control using RTS/CTS messages.

There are many options in Multiple Access Control. One is CSMA/CA (Carrier Sense Multiple Access/Collision Avoidance); another is pure ALOHA (where messages are sent at any time and then resent if the message is not received). In the CSMA/CA option, RTS (Request To Send)/ CTS (Clear To Send) messages are used. Referring now to FIG. 20, when a node wants to send a packet to other node, it sends RTS at first and then waits for CTS. After receiving RTS, the receiving node sends a CTS frame to acknowledge the right for the sending node to send data frame. This procedure reduces the chance of collision by hidden nodes.

A node receiving an error-free frame can send an ACK frame to the sending node to acknowledge the successful reception of the frame.

When a node wants to send a packet to other node, i.e. it wants to unicast a message, it sets its node ID in the source NID field of the packet and its destination node ID in destination NID field. If a node isn't sending to one of its neighbors, and if the destination node is below the source in the tree, the source node sets its child node ID in the receiving NID field and asks its child node to forward to the destination. If the source isn't sending to one of its neighbors, and if the destination node isn't below the source branch, the source sets its parent node ID in the receiving NID field and sends the packet to its parent. Each intermediate node should relay the packet toward the destination node as it updates receiving and transmitting NID fields.

The packet is routed along the tree topology except for the last one hop. If the destination node is below the sender node in the tree structure, the packet is forwarded along the branch to the destination. Otherwise, the packet goes up along the tree structure and looks for the destination. If the intermediate node has the destination node in its neighbor list, the packet is routed apart from the tree route.

Figure 21:
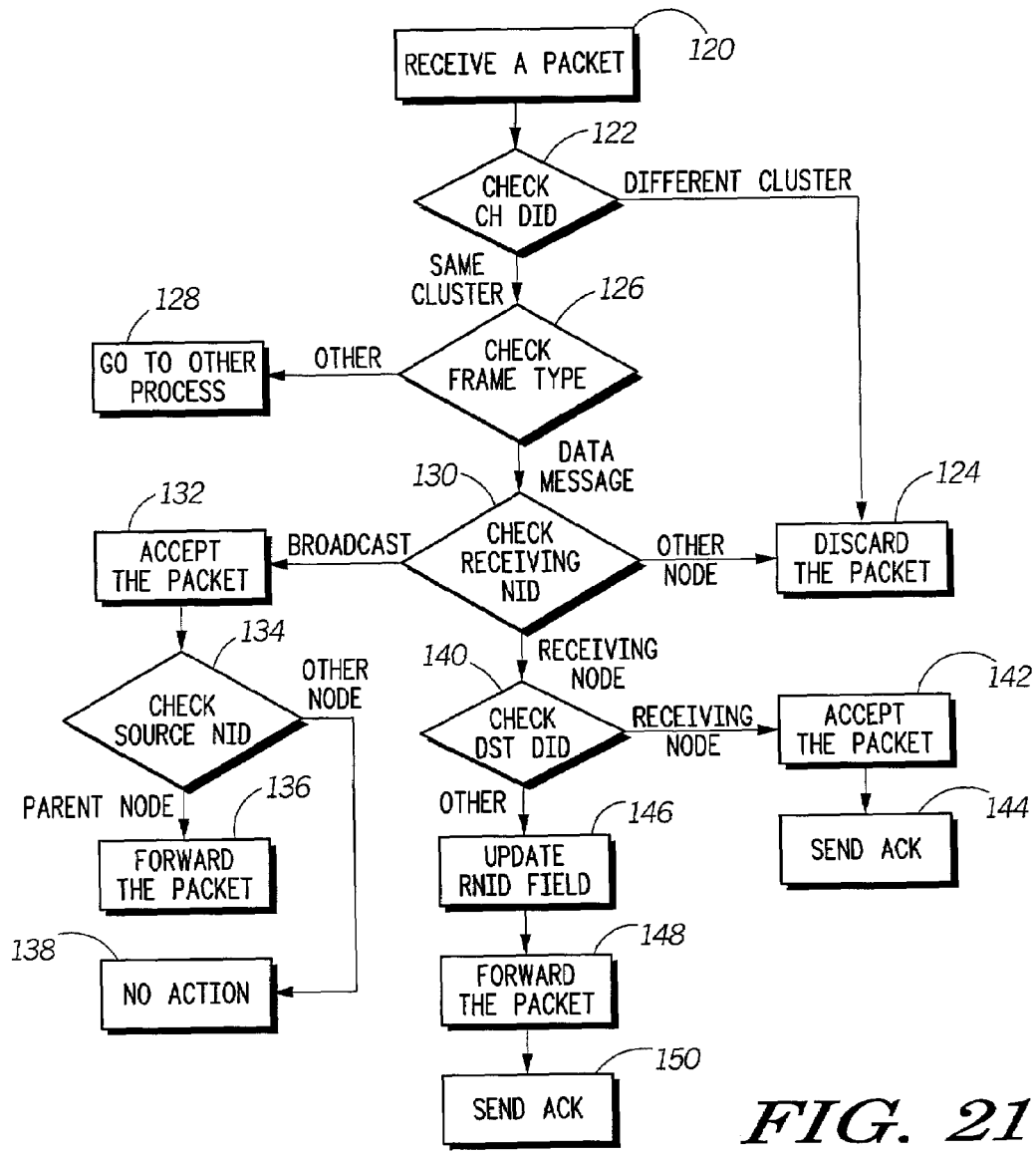
FIG. 21 is a flow diagram showing data packet forwarding flow.

When a node receives a unicast message, the receiving node should respond to the transmitting node with an ACK message. The detail of packet forwarding process is described in FIG. 21. Referring to the flow chart in FIG. 21, the receiving node receives a packet at block 120. At decision block 122 a check is made to determine if the Cluster Head ID matches that of the cluster. If the Cluster Head ID is that of a different cluster, the packet is discarded at block 124. If the Cluster Head ID is that of the present cluster, flow continues to decision block 126. At decision block 126, the frame type is checked. If the frame type does not indicate that the packet contains data, the packet is passed to a different process at block 128. If the frame type indicates that the packet contains data, flow continues to decision block 130, where a check is made to determine if the Node ID is that of the present node. If the ID is that of another node, flow continues to block 124 and the packet is discarded. If the ID indicates that this is a broadcast message, flow continues to block 132 where the packet is accepted. At decision block 134 the Source Node ID is checked. If the source Node ID is that of the parent node, the packet is forwarded at block 136, otherwise no further action is taken, as indicated by block 138. Returning to decision block 130, if the receiving node ID is that of the receiving node, flow continues to decision block 140 and the Destination Device ID is checked. If the Destination Device ID matches the receiving node ID, the packet is accepted at block 142 and an acknowledgement (ACK) message is sent at block 144. If the Destination Device ID does not match the receiving node ID, the RNID field in the packet is updated at block 146, the packet is forwarded at block 148 and an ACK message is sent at block 150.

The broadcast message within a cluster is sent by the cluster head and forwarded by all member nodes. The receiving node shouldn't respond to the broadcast message with ACK message. A member node should forward the broadcast message that is sent by its parent to avoid forwarding the same packet more than once.

Large packets may be sent in several parts, in accordance with a packet fragmentation rule.

Inter Cluster Network

The preferred embodiment of multi-cluster network formation and the subsequent communication between clusters is now described.

To form a multi-cluster network, a Designated Device is needed in the network. The Designated Device assumes an important role in the network. It has the responsibility to assign a unique cluster ID to each cluster head. This cluster ID, combined with the node ID that the cluster head assigns to each node within a cluster, forms a logical address and is used to route packets. Another role of the Designated Device is to calculate the shortest route from the cluster to Designated Device and inform it to all nodes within the network.

Inter Cluster Network: Network Formation Process

Each node is unique due to the combination of the cluster ID (CID) and the node ID (NID). The NID is assigned by each cluster head (CH) and the Designated Device (DD) assigns a unique CID to each cluster in early stage of multi-cluster network formation.

Figure 22:
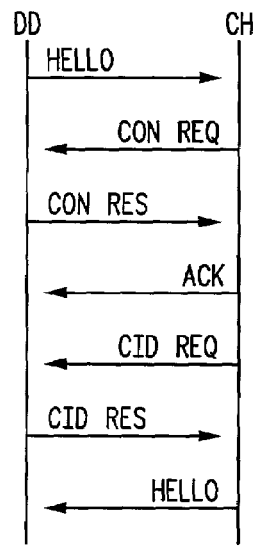
FIG. 22 is an interaction diagram of a first example of cluster ID assignment.
Figure 23:
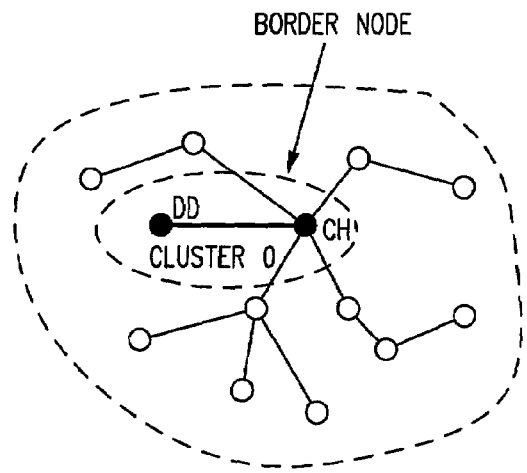
FIG. 23 is a diagrammatic representation of a network corresponding to FIG. 22.

Referring now to the interaction diagram shown in FIG. 22, when the DD joins the network, it acts as the cluster head of cluster 0 and starts to send HELLO message to the neighborhood. If a CH has received this message, it sends a CONNECTION REQUEST message and joins the cluster 0. After that, the CH requests a CID to the DD. In this case, the CH is a border node that has two logical addresses. One is for a member node of the cluster 0 and the other is for a cluster head. When the CH gets a new CID, it informs to its member nodes by sending a HELLO message. The corresponding network is shown in FIG. 23.

Figure 24:
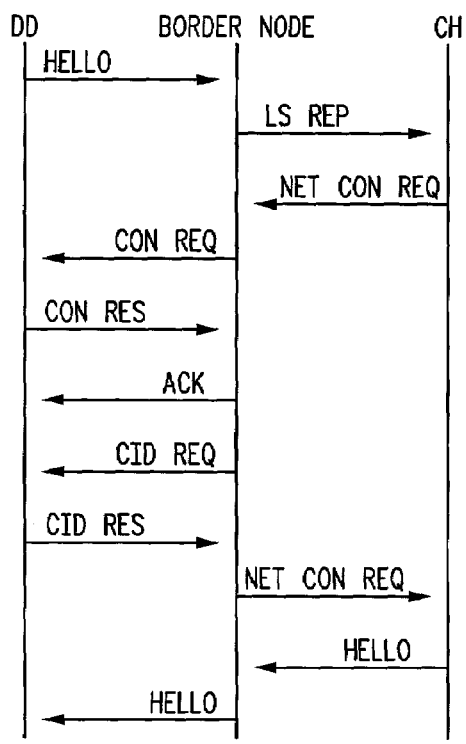
FIG. 24 is an interaction diagram of a second example of cluster ID assignment.
Figure 25:
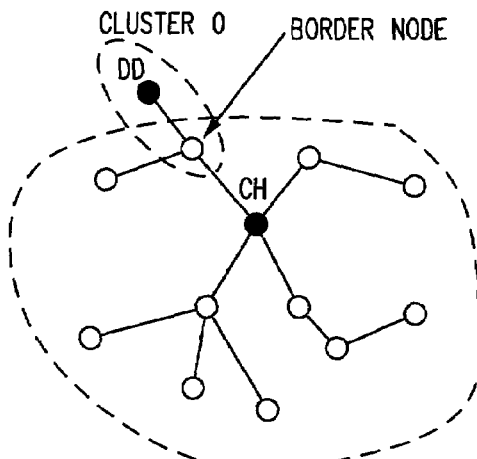
FIG. 25 is a diagrammatic representation of a network corresponding to FIG. 24.

Referring to FIG. 24, if a member node has received the HELLO message from the DD, it adds CID 0 in its neighbor list and reports to its CH. The reported CH selects the member node as a border node to its parent cluster and sends a NETWORK CONNECTION REQUEST message to the member node to set up a connection with the DD. The border node requests a connection and joins the cluster 0 as its member node. Then it sends a CID REQUEST message to the DD. After the CID RESPONSE message arrival, the border node sends a NETWORK CONNECTION RESPONSE message that contains a new CID to the CH. When the CH gets a new CID, it informs its member nodes by the HELLO message. The corresponding network is shown in FIG. 25.

The clusters not bordering cluster 0 use intermediate clusters to get a CID. Two cases can be thought as the same as above. One case, shown in the interaction diagram in FIG. 26 and the network in FIG. 27, is where the CH becomes the border node to its parent cluster. The other case, shown in the interaction diagram of FIG. 28 and the corresponding network in FIG. 29, is where the CH names a member node as the border to its parent cluster. In both cases, the process is triggered by the HELLO message that contains a CID from 1 to 253 instead of the HELLO from the DD.

Each member node of the cluster records its parent cluster, child/lower clusters and the border node IDs associated with both the parent and child clusters. The DD stores the whole tree structure of the clusters.

Inter Cluster Network: Network Maintenance

Although the clusters form an initial tree topology in the CID assignment procedure, it may not be the optimal tree structure and the tree structure may change due to the failure of nodes. The clusters use the cluster link-state information to calculate the optimized route and periodically update their topology for the network redundancy.

Every cluster reports its link-state information to the DD. The cluster head periodically sends a NETWORK LINK-STATE REPORT message that contains its neighbor cluster CID list to the DD. An exemplary network is shown in FIG. 30 and the corresponding link-state reports are shown in FIG. 31.

Based on the NETWORK LINK-STATE REPORT message, the DD periodically calculates the optimized tree route and sends a NETWORK TOPOLOGY UPDATE message to inform up-to-date route from the DD to the clusters. An exemplary network is shown in FIG. 32 and the corresponding network topology updates are shown in FIG. 33. The DD chooses the route with the smallest hop count. If there are several routes with the same hop count, the DD should choose the cluster that has the smallest CID as the parent cluster, or some other functional rule for arbitrating ties.

If a cluster head receives the NETWORK TOPOLOGY UPDATE message and determines that a different parent cluster is linked to the cluster, it changes the parent cluster as indicated in the message. All nodes within the cluster should memorize its parent cluster, child/lower clusters and the border nodes' NID at this time.

When a failure has occurred in the network, the cluster may have to find an alternative route to the DD. This feature is achieved by using the messages explained above.

In the example network shown in FIG. 34, a problem has occurred in cluster 1. The NETWORK LINK-STATE REPORT messages, shown in FIG. 35, from cluster 1 and 3 fail to arrive at the DD. The link-sate report from cluster 3 fails to arrive because it was linked to the DD via the failed cluster. The link-state report from cluster 2 no longer indicates a link to cluster 1. The DD broadcasts a new NETWORK TOPLOGY UPDATE message, shown in FIG. 36, and indicates cluster 3 to switch the parent to cluster 4.

A backup Designated Device (BDD) can be prepared to prevent network down time due to the DD's trouble. One example is that a BDD is connected to the DD by wired or wireless network and periodically duplicate the list of cluster ID and network link-state information from the DD. The BDD takes over the DD role as soon as it detects the DD's failure. Other solutions may be possible to realize the BDD.

Inter Cluster Communication

Figure 37:
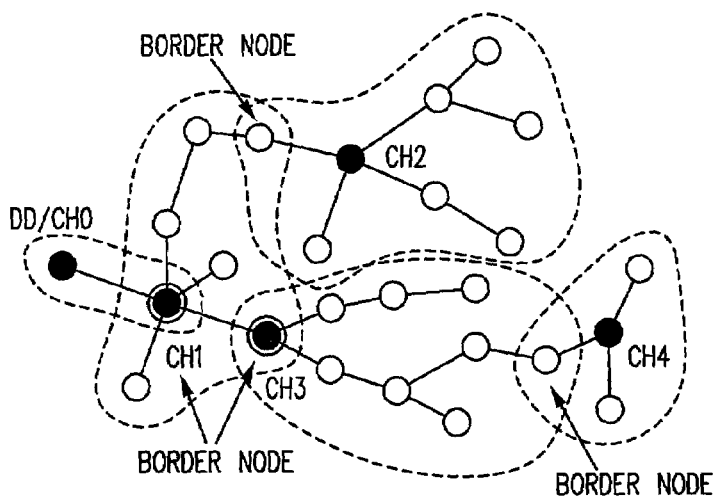
FIG. 37 is a diagrammatic representation of an exemplary multi-cluster network illustrating border nodes.

Inter cluster communication is realized by routing. The border nodes act as routers that connect clusters and relay packets between clusters. An exemplary multi-cluster network with border nodes is shown in FIG. 37.

Every node knows its parent cluster, child/lower cluster and the border node ID. When a node sends a unicast message (a message to a specific node), receiving nodes can decide where they should send/forward the packet. When a border node receives a packet, it examines the destination address, then forwards to the next border node in the adjacent cluster or to the destination node within the cluster.

Only the DD can broadcast a message by sending it to all nodes within its network. The message is forwarded along the tree route of clusters. The border node should forward the broadcast packet from the parent cluster to the child cluster.

An exemplary implementation of the network of the present invention is described in more detail below Address Scheme An exemplary address scheme is described below.

Each node is assigned a 16 bit logical address that consists of a cluster ID (CID) and a node ID (NID).

Cluster ID

The Designated Device assigns a unique 8-bit cluster ID to the cluster. CID 255 means all clusters and is used for broadcast message.

TABLE 1

Cluster ID

| Binary | Decimal | CID Function |
| --- | --- | --- |
| 00000000 | 0 | Designated Device (DD) |
| 00000001 | 1 | Regular Cluster |
| \| | \| | |
| 11111101 | 253 | |
| 11111110 | 254 | Temporary Cluster ID |
| 11111111 | 255 | Broadcast |

Node ID

The cluster head assigns a unique 8-bit node ID to its member nodes. The cluster head uses NID 0. NID 255 is for broadcast and 254 for temporary use.

TABLE 2

Node ID

| Binary | Decimal | NID Function |
| --- | --- | --- |
| 00000000 | 0 | Cluster Head (CH) |
| 00000001 | 1 | Member node |
| \| | \| | |
| 11111101 | 253 | |
| 11111110 | 254 | Temporary node ID |
| 11111111 | 255 | Broadcast |

Frame Structure

One embodiment of the different types of packets that are used for communication within and clusters is described below.

Frame Type

A 6-bit field is defined for the frame type. The first two bits define the category of the function and the next four bits indicate the detail functions.

TABLE 3

Frame Type

| Frame Type | | |
| --- | --- | --- |
| (bit 1, bit 2) | (bit 3, 4, 5, 6) | Frame Function |
| Intra Cluster Management Frame 00 | 0000 | HELLO |
| | 0001 | CONNECTION REQUEST |
| | 0010 | CONNECTION RESPONSE |
| | 0011 | NODE ID REQUEST |
| | 0100 | NODE ID RESPONSE |
| | 0101 | DISCONNECTION REQUEST |
| | 0110 | DISCONNECTION RESPONSE |

TABLE 3-continued

Frame Type

| Frame Type | | |
|---|---|---|
| (bit 1, bit 2) | (bit 3, 4, 5, 6) | Frame Function |
| | 0111 | LINK-STATE REPORT |
| | 1000 | TOPOLOGY UPDATE |
| | 1001–1111 | Reserved |
| Inter Cluster Management Frame 01 | 0000 | NETWORK CONNECTION REQUEST |
| | 0001 | NETWORK CONNECTION RESPONSE |
| | 0010 | CLUSTER ID REQUEST |
| | 0011 | CLUSTER ID RESPONSE |
| | 0100 | NETWORK DISCONNECTION REQUEST |
| | 0101 | NETWORK DISCONNECTION RESPONSE |
| | 0110 | NETWORK LINK-STATE REPORT |
| | 0111 | NETWORK TOPOLOGY UPDATE |
| | 1000–1111 | Reserved |
| Control Frame 10 | 0000 | REQUEST TO SEND (RTS) |
| | 0001 | CLEAR TO SEND (CTS) |
| | 0010 | ACKNOWLEDGEMENT (ACK) for Intra Cluster |
| | 0011 | ACKNOWLEDGEMENT (ACK) for Inter Cluster |
| | 0100–1111 | Reserved |
| Data Frame 11 | 0000 | INTRA CLUSTER DATA |
| | 0001 | INTRA CLUSTER DATA with ACK |
| | 0010 | INTER CLUSTER DATA |
| | 0011 | INTER CLUSTER DATA with ACK |
| | 0100–1111 | Reserved |

Management Frames

Intra Cluster Management Frames

Figure 38:
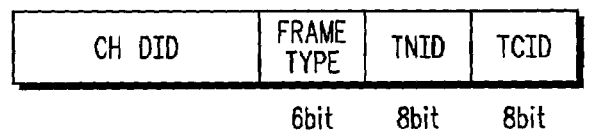
FIG. 38 shows the structure of an exemplary HELLO message.

The structure of the HELLO message is shown in FIG. 38. Referring to FIG. 38, CH DID denotes the Cluster Head Device ID, which is a part of cluster head MAC address. This field is used to determine whether the transmitting node belongs to the same node cluster. TNID denotes the Transmitting Node ID: the node ID of source/intermediate node that sends the packet. TCID denotes the Transmitting Cluster ID, i.e. the cluster ID of transmitter. Before assignment of CID, the cluster head uses temporary CID 254.

Figure 39:
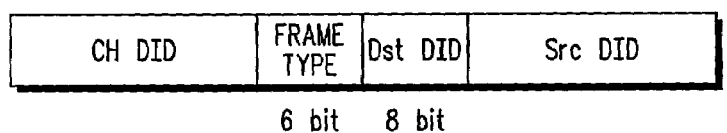
FIG. 39 shows the structure of an exemplary CONNECTION REQUEST message.

The structure of the CONNECTION REQUEST message is shown in FIG. 39. Referring to FIG. 39, CH DID denotes the Cluster Head Device ID which is a part of the cluster head MAC address that the new node wants to join. Dst NID denotes the Destination Node ID, i.e. the node ID that the new node requests a connection and Src DID denotes the Source Device ID: a part of the source node MAC.

Figure 40:
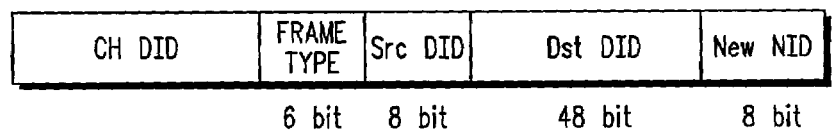
FIG. 40 shows the structure of an exemplary CONNECTION RESPONSE message.

The structure of the CONNECTION RESPONSE message is shown in FIG. 40. Referring to FIG. 40, CH DID denotes the Cluster Head Device ID. Src NID denotes the Source Node ID, i.e. the node ID that is requested the connection by the new node. Dst DID is the Destination Device ID, and is a copy of Src DID field of CONNECTION REQUEST message. New NID denotes the New Node ID, which is the new node ID that is assigned to the requester node. When the requested node rejects the request, it puts 254 in this field.

Figure 41:
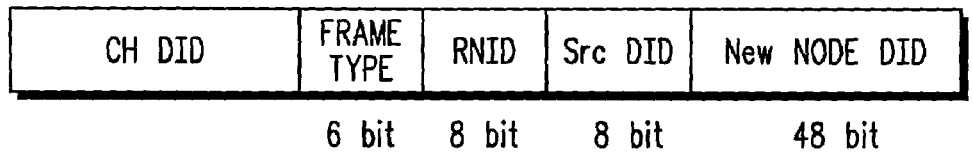
FIG. 41 shows the structure of an exemplary NODE ID REQUEST message.
Figure 42:
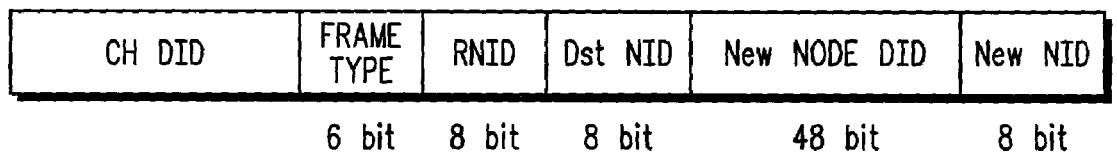
FIG. 42 shows the structure of an exemplary NODE ID RESPONSE message.

FIG. 41 shows the structure of the NODE ID REQUEST message. Referring to FIG. 41, CH DID denotes the Cluster Head Device ID and RNID denotes the Receiving Node ID, i.e. the node ID of destination/intermediate node that should receive the packet. Src NID denotes the Source Node ID, i.e. the node ID that is requesting the connection for the new node. New Node DID denotes the New Node Device ID. This is a copy of Src DID field of the CONNECTION REQUEST message The structure of the NODE ID RESPONSE is shown in FIG. 42. Referring to FIG. 42, CH DID denotes the Cluster Head Device ID, RNID denotes the Receiving Node ID, Dst NID denotes the Destination Node ID and New Node DID denotes the New Node Device ID. The New Node DID is a copy of New Node DID field of the CLUSTER ID REQUEST message. New NID denotes the New Node ID, i.e. the node ID that is assigned to the new node. When the cluster head rejects the request, it puts the ID 254 in this field.

Figure 43:
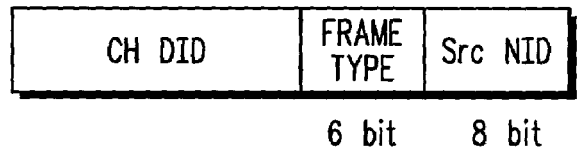
FIG. 43 shows the structure of an exemplary DISCONNECTION REQUEST message.

FIG. 43 shows the structure of the DISCONNECTION REQUEST message. Referring to FIG. 43, CH DID denotes the Cluster Head Device ID and Src NID denotes the Source Node ID (the node ID of requesting node).

Figure 44:
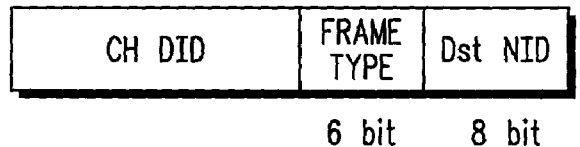
FIG. 44 shows the structure of an exemplary DISCONNECTION RESPONSE message.

FIG. 44 shows the structure of the DISCONNECTION RESPONSE message. Referring to FIG. 44, CH DID denotes the Cluster Head Device ID and Dst NID denotes the Destination Node ID.

FIG. 45 shows the structure of the LINK-STATE REPORT message. Referring to FIG. 45, CH DID denotes the Cluster Head Device ID, RNID denotes the Receiving Node ID, and Src NID denotes the Source Node ID. Length 1 denotes the number of NID fields and Length 2 denotes the number of CID fields. NID #n is the identifier of neighbor node #n. CID #m is the identifier of neighbor cluster #m.

FIG. 46 shows the structure of the TOPOLOGY UPDATE message. Referring to FIG. 46, CH DID denotes the Cluster Head Device ID, Length 1 denotes the number of NID fields and Length 2 denotes the number of CID fields. NID #n is the identifier of member node #n. Parent NID is the Parent Node ID, that is the parent node ID for the member node #n named in the previous field. CID #m is the identifier for neighbor Cluster #m. Border NID is the Border Node ID: the border node ID for the cluster #m named in the previous field.

Inter Cluster Management Frames

FIG. 47 shows the structure of the NETWORK CONNECTION REQUEST message. Referring to FIG. 47, CH DID denotes the Cluster Head Device ID, RNID denotes the Receiving Node ID and Dst NID denotes the Destination Node ID. CID denotes the cluster ID that the border node should set up a connection with.

Figure 48:
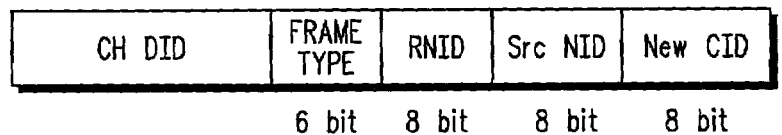
FIG. 48 shows the structure of an exemplary NETWORK CONNECTION RESPONSE message.

FIG. 48 shows the structure of the NETWORK CONNECTION RESPONSE message. Referring to FIG. 48, CH DID denotes the Cluster Head Device ID, RNID denotes the Receiving Node ID and Src NID is the Source Node ID, that is the node ID of the border node. New CID is the New Cluster ID that is assigned to the cluster head by the Designated Device.

Figure 49:
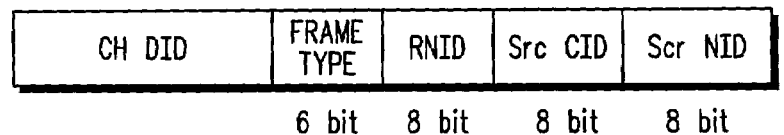
FIG. 49 shows the structure of an exemplary CLUSTER ID REQUEST message.

FIG. 49 shows the structure of the CLUSTER ID REQUEST message. Referring to FIG. 49, CH DID denotes the Cluster Head Device ID, RNID is the Receiving Node ID and Src CID is the Source Cluster ID, that is the cluster ID of the border node. Src NID is the Source Node ID.

Figure 50:
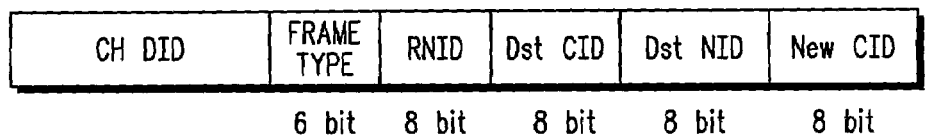
FIG. 50 shows the structure of an exemplary CLUSTER ID RESPONSE message.

FIG. 50 shows the structure of the CLUSTER ID RESPONSE message. Referring to FIG. 50, CH DID denotes the Cluster Head Device ID. RNID denotes the Receiving Node ID, that is the node ID of destination/intermediate node that should receive the packet. Dst CID is the Destination Cluster ID, i.e. the cluster ID of the border node that requested a new CID. Dst NID is the Destination Node ID, i.e. the node ID of the border node that requested a new CID. New CID is the New Cluster ID that is assigned by the Designated Device.

Figure 51:
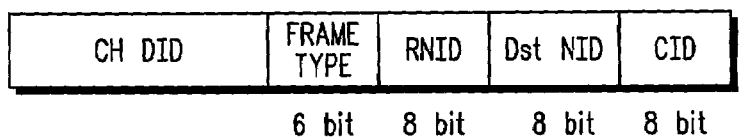
FIG. 51 shows the structure of an exemplary NETWORK DISCONNECTION REQUEST message.

FIG. 51 shows the structure of the NETWORK DISCONNECTION REQUEST message. Referring to FIG. 51, CH DID denotes the Cluster Head Device ID. RNID denotes the Receiving Node ID and Dst NID denotes the Destination Node ID. CID is the cluster ID that the border node should disconnect.

Figure 52:
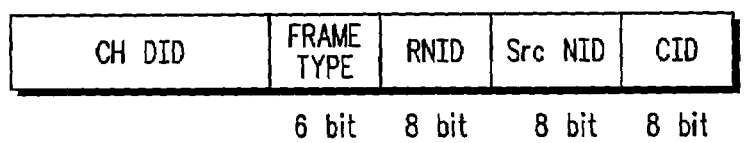
FIG. 52 shows the structure of an exemplary NETWORK DISCONNECTION RESPONSE message.

FIG. 52 shows the structure of the NETWORK DISCONNECTION RESPONSE message. Referring to FIG. 52, CH DID denotes the Cluster Head Device ID, RNID denotes the Receiving Node ID, Src NID denotes the Source Node ID and CID denotes the cluster ID that the border node has disconnected with.

Figure 53:
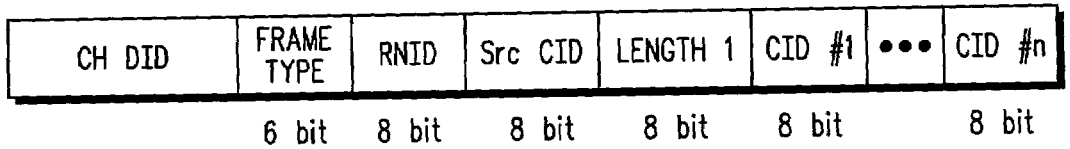
FIG. 53 shows the structure of an exemplary NETWORK LINK-STATE REPORT message.

FIG. 53 shows the structure of the NETWORK LINK-STATE REPORT message. Referring to FIG. 53, CH DID denotes the Cluster Head Device ID, RNID denotes the Receiving Node ID and Src NID denotes the Source Node ID. Length 1 denotes the number of fields for CIDs and CID #n denotes the identifier of the neighbor cluster.

Figure 54:
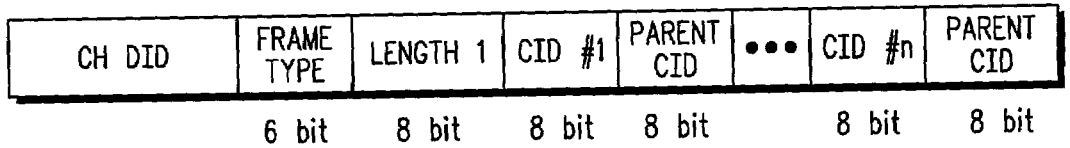
FIG. 54 shows the structure of an exemplary NETWORK TOPOLOGY UPDATE message.

FIG. 54 shows the structure of the NETWORK TOPOLOGY UPDATE message. Referring to FIG. 54, CH DID denotes the Cluster Head Device ID, Length 1 denotes the number of fields for CIDs and their Parent CIDs. CID #n denotes the identifier of the cluster ID that exists in the network. Parent CID is the Parent Cluster ID for the cluster #n named in previous field.

Control Frames

Figure 55:
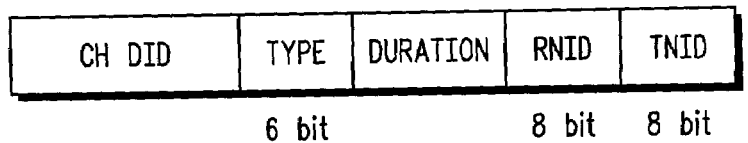
FIG. 55 shows the structure of an exemplary REQUEST TO SEND (RTS) message.

FIG. 55 shows the structure of the RTS message. Referring to FIG. 55, CH DID denotes the Cluster Head Device ID. The value of the Duration field is the amount of time the sending node needs to transmit the data frame, one CTS frame, one ACK frame and three inter-frame space intervals. RNID denotes the Receiving Node ID and TNID denotes the Transmitting Node ID.

Figure 56:
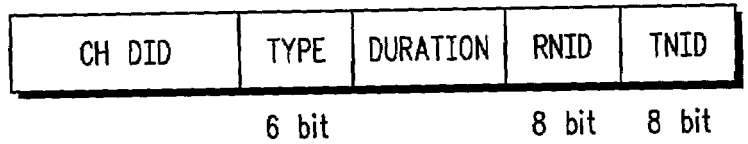
FIG. 56 shows the structure of an exemplary CLEAR TO SEND (CTS) message.

FIG. 56 shows the structure of the CTS message. Referring to FIG. 56, CH DID denotes the Cluster Head Device ID. Duration is the duration of previous RTS frame minus the time required to transmit the CTS frame and an inter-frame space interval. RNID denotes the Receiving Node ID and TNID denotes the Transmitting Node ID.

Figure 57:
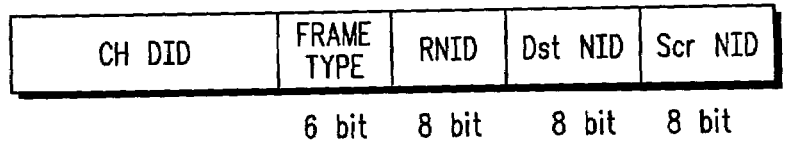
FIG. 57 shows the structure of an exemplary ACKNOWLEDGEMENT (ACK) for Intra Cluster Communication.

FIG. 57 shows the structure of the ACK message for Intra Cluster Communication. Referring to FIG. 57, CH DID denotes the Cluster Head Device ID and RNID denotes Receiving Node ID, that is the node ID of destination/intermediate node that should receive the packet. Dst NID denotes the Destination Node ID and Src NID denotes the Source Node ID.

FIG. 58 shows the structure of the ACK message for Inter Cluster Communication. Referring to FIG. 58, CH DID denotes Cluster Head Device ID, RNID denotes the Receiving Node ID, Dst CID denotes the Destination Cluster ID.and Dst NID denotes the Destination Node ID. Src CID denotes Source Cluster ID and Src NID denotes the Source Node ID.

Data Frames.

FIG. 59 shows the structure of an Intra Cluster Data Frame. CH DID denotes the Cluster Head Device ID, RNID denotes the Receiving Node ID (the node ID of destination/intermediate node that should receive the packet) and Dst NID denotes the Destination Node ID. Src NID is the Source Node ID and Payload denotes the Data itself.

The Intra Cluster Data Frame with ACK has the same frame structure as Intra Cluster Data Frame except the Frame Type field.

FIG. 60 shows an Inter Cluster Data Frame. Referring to FIG. 60, CH DID denotes the Cluster Head Device ID, RNID denotes the Receiving Node ID (the node ID of destination/intermediate node that should receive the packet), Dst CID denotes the Destination Cluster ID and Dst NID denotes the node ID of the destination node. Src CID denotes the node ID of the source node, Src NID denotes the Source Node ID and Payload denotes the Data itself.

The Inter Cluster Data Frame with ACK has the same frame structure as Inter Cluster Data Frame except the Frame Type field.

Those of ordinary skill in the art will recognize that the present invention has been described in terms of exemplary embodiments based upon use of a particular message set. However, the invention should not be so limited, since the present invention could be implemented functionally equivalent messages.

The nodes themselves may comprise a variety of hardware components including as special purpose hardware and/or dedicated processors. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

Each node is directed by a computer program. Those ordinarily skilled in the art will appreciate that the program steps and associated data used to implement the embodiments described above can be implemented using disc storage as well as other forms of storage, such as, for example, Read Only Memory (ROM) devices, Random Access Memory (RAM) devices, optical storage elements, magnetic storage elements, magneto-optical storage elements, flash memory, core memory and/or other equivalent storage technologies without departing from the present invention. Such alternative storage devices should be considered equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A node structure comprising a plurality of nodes, wherein a first node of the plurality of nodes is directed by a computer program to associate with a cluster of nodes within communication range of the first node in order to form a network by:

discovering if any neighboring node is a cluster head;

if a cluster head is discovered, establishing a communication link with the cluster head during association of the first node with the cluster of nodes to form the network; and if no cluster head is discovered, directing the first node itself to become a cluster head during association of the first node with the cluster of nodes to form the network.

2. A structure in accordance with claim 1, wherein the discovering comprises listening for a HELLO message for a predetermined period of time.

3. A structure in accordance with claim 1, wherein the plurality of nodes includes a cluster head and the first node of the plurality of nodes contains a link-state list in a memory and wherein the establishing a communication link with the cluster head comprises:

obtaining an identifier of the cluster head; and
updating the link state list with the identifier of the cluster head.

4. A structure in accordance with claim 1, wherein, if no neighboring node is a cluster head, the computer program is further operable to direct the first node to broadcast a HELLO message to neighboring nodes.

5. A structure in accordance with claim 4, wherein if a neighboring node responds to the HELLO message, the computer program is operable to direct the node in establishing communication with the neighboring node.

6. A structure in accordance with claim 5, wherein the cluster head has a cluster head identifier and a link state list stored in a memory and wherein the establishing communication with the neighboring node comprises:
the cluster head assigning a node identifier to the neighboring node;
the cluster head providing the neighboring node with the cluster head identifier; and
the cluster head updating the link-state list with the node identifier.

7. A structure in accordance with claim 6, wherein, if the size of the cluster has reached a defined limit, the node identifier is a predetermined temporary node identifier that directs the neighboring node to stop responding to HELLO messages from the cluster head.

8. A structure in accordance with claim 1, wherein the plurality of nodes includes a cluster head and the computer program is further operable to direct the first node to link with a second node by:
receiving a HELLO message broadcast by the cluster head;
transmitting the HELLO message to neighboring nodes;
receiving a CONNECTION REQUEST message from the second node;
transmitting a NODE IDENTIFIER REQUEST to the cluster head;
receiving a NODE IDENTIFIER RESPONSE from the cluster head; and
transmitting a CONNECTION RESPONSE message to the second node.

9. A structure in accordance with claim 8, wherein if the cluster has reached a defined limit the node identifier response from the cluster head includes a predetermined temporary node identifier that directs the second node to stop sending CONNECTION REQUEST messages to the first node.

10. A structure in accordance with claim 1, wherein the computer program is further operable to direct the first node periodically to broadcast a HELLO message to neighboring nodes and to update a neighbor list stored in memory according to any responses to the HELLO message.

11. A structure in accordance with claim 10, wherein a node is removed from the neighbor list if it does not respond to the HELLO message within a specified time.

12. A structure in accordance with claim 10, wherein if a response to the HELLO message is received from a node in a different cluster, the cluster identifier of the responding node is added to the neighbor list.

13. A structure in accordance with claim 10, wherein the first node is not a cluster head and the computer program is further operable to direct the first node to broadcast the HELLO message to neighboring nodes in response to a HELLO message from the cluster head.

14. A structure in accordance with claim 1, wherein the computer program is operable to direct the first node to send data in a frame cormprising:

the data;
a cluster head device identifier;
a frame type indicator;
a receiving node identifier;
a destination node identifier; and
a source node identifier.

15. A structure in accordance with claim 14, wherein the data is sent to a node in a different cluster and wherein the frame further comprises:
a transmitting node identifier;
a destination cluster head identifier; and
a source cluster head identifier.

16. A structure in accordance with claim 1, wherein the computer program is operable to direct the first node to process a received information packet having a Cluster Head Identifier, a Frame Type, a Receiving Node Identifier and a Destination Node Identifier, by:
checking the Cluster Head Identifier;
checking the Frame Type;
checking the Receiving Node Identifier; and
checking the Destination Node Identifier;
wherein the packet is accepted if the Cluster Head Identifier, the Receiving Node Identifier and the Destination Node Identifier match those of the first node and the Frame Type indicates that the packet contains a data message.

17. A structure in accordance with claim 16, wherein if the Cluster Head Identifier and the Receiving Node Identifier match those of the first node and the Frame Type indicates that the packet contains a data message, but the Destination Node Identifier is that of a different node, the Receiving Node Identifier of the packet is updated with the identifier of the first node, the packet is forwarded on the structure and an acknowledgement message is sent.

18. A structure in accordance with claim 16, wherein the packet is accepted if the Cluster Head Identifier matches that of the first node, the Frame Type indicates that the packet contains a data message and the Receiving Node Identifier indicates that the packet contains a broadcast message.

19. A structure in accordance with claim 18, wherein the information packet includes a Source Node Identifier, and the accepted broadcast message is forwarded to the structure if the Source Node Identifier is that of the parent node of the first node.

20. A structure in accordance with claim 1, wherein the plurality of nodes includes one or more clusters, each cluster comprising a node that is a cluster head and one or more member nodes linked to the cluster head.

21. A structure in accordance with claim 20, wherein the plurality of nodes further comprises a designated device directed by a computer program that is operable to direct the designated device to assign a cluster identifiers to the cluster heads of the one or more clusters.

22. A structure in accordance with claim 20, wherein the plurality of nodes includes a border node that is a member of at least two clusters, and wherein the border node act as router connecting the clusters and relaying information packets between the clusters.

23. A method for self-organization of a plurality of nodes to form a network comprising a cluster, the method comprising the processes of cluster formation, cluster network maintenance and intra-cluster communication, wherein, for a node of the plurality of nodes:
the process of cluster formation comprises:
discovering if any neighboring node is a cluster head;
if the cluster head is discovered, establishing a communication link with the cluster head; and if no cluster head is discovered, directing the node of the plurality of nodes to become the cluster head, the process of cluster network maintenance comprises:
periodically broadcasting a HELLO message to neighboring nodes;
receiving responses to the HELLO message; and
updating a neighbor list in accordance with responses to the HELLO message and the process of intra-cluster communication comprises:
receiving an information packet having a Cluster Head Identifier, a Frame Type, a Receiving Node Identifier and a Destination Node Identifier;
checking the Cluster Head Identifier;
checking the Frame Type;
checking the Receiving Node Identifier;
checking the Destination Node Identifier;
accepting the packet if the Cluster Head Identifier, the Receiving Node Identifier and the Destination Node Identifier match those of the node and the Frame Type indicates that the packet contains a data message.

24. A method in accordance with claim 23, wherein the discovering in the process of cluster formation comprises listening for a HELLO message for a predetermined period of time.

25. A method in accordance with claim 23, wherein the establishing a communication link with the cluster head in the cluster formation process comprises:
obtaining an identifier of the cluster head; and
updating a link-state list with the identifier of the cluster head.

26. A method in accordance with claim 23, wherein the cluster formation process further comprises broadcasting a HELLO message to neighboring nodes from the cluster head.

27. A method in accordance with claim 26, wherein the cluster formation process further comprises establishing communication between the cluster head and a neighboring node if the neighboring node responds to the HELLO message.

28. A method in accordance with claim 27, wherein the cluster head has a cluster head identifier and a link-state list and wherein the establishing communication with the neighboring node in the cluster formation process comprises:
the cluster head assigning a node identifier to the neighboring node;
the cluster head providing the neighboring node with the cluster head identifier; and
the cluster head updating the link-state list with the node identifier.

29. A method in accordance with claim 28, wherein, if the size of the cluster has reached a defined limit, the node identifier is a predetermined temporary node identifier that directs the neighboring node to stop responding to HELLO messages from the cluster head.

30. A method in accordance with claim 23, wherein the plurality of nodes includes a cluster head and the cluster formation process further comprises establishing a link between a first node and a second node by:
receiving a HELLO message broadcast by the cluster head;
transmitting the HELLO message to neighboring nodes;
receiving a CONNECTION REQUEST message from the second node;
transmitting a NODE IDENTIFIER REQUEST to the cluster head;
receiving a NODE IDENTIFIER RESPONSE from the cluster head; and
transmitting a CONNECTION RESPONSE message to the second node.

31. A method in accordance with claim 30, wherein, if the cluster has reached a defined limit, the node identifier response from the cluster head includes a predetermined temporary node identifier that directs the second node to stop sending CONNECTION REQUEST messages to the first node.

32. A method in accordance with claim 23, wherein the process of cluster network maintenance further comprises a node of the plurality of nodes:
periodically broadcasting a HELLO message to neighboring nodes;
receiving responses to the HELLO message; and
updating a neighbor list in accordance with the responses to the HELLO message.

33. A method in accordance with claim 32, further comprising removing a node from the neighbor list if it does not respond to the HELLO message within a specified time.

34. A method in accordance with claim 32, further comprising adding the cluster identifier of the responding node to the neighbor list if a response to the HELLO message is received from a node in a different cluster.

35. A method in accordance with claim 34, wherein the node of the plurality of nodes is not a cluster head and the node broadcasts the HELLO message to neighboring nodes in response to a HELLO message from the cluster head.

36. A method in accordance with claim 23, wherein the plurality of nodes includes a cluster head and the process of cluster network maintenance further comprises a node of the plurality of nodes periodically sending a link-state report that contains its neighbor list to the cluster head.

37. A method in accordance with claim 36, wherein the process of cluster maintenance further comprises:
the cluster head generating a topology list based upon one or more link-state reports received from neighboring nodes; and
the cluster head sending a TOPOLOGY UPDATE message to neighboring nodes.

38. A method in accordance with claim 36, wherein the topology list is generated by selecting the route between the cluster head and a neighboring node that uses the smallest number of nodes.

39. A method in accordance with claim 27, wherein the process of cluster maintenance further comprises updating the topology list if the node fails to send a link-state report within a specified time.

40. A method in accordance with claim 23, wherein the process of intra-cluster communication further comprises:
updating the Receiving Node Identifier of a packet with the identifier of the node;
forwarding the packet on the network; and
sending an acknowledgement message;
if the Cluster Head Identifier and the Receiving Node Identifier match those of the node and the Frame Type indicates that the packet contains a data message, but the Destination Node Identifier is that of a different node.

41. A network in accordance with claim 23, wherein the process of intra-cluster communication further comprises accepting a packet if the Cluster Head Identifier matches that of the node, the Frame Type indicates that the packet contains a data message and the Receiving Node Identifier indicates that the packet contains a broadcast message.

42. A method in accordance with claim 41, wherein the information packet includes a Source Node Identifier, and the process of intra-cluster communication further comprises forwarding the accepted broadcast message to the network if the Source Node Identifier is that of the parent node of the node.

43. A method in accordance with claim 23, wherein the network comprises a plurality of clusters and a plurality of cluster heads and wherein the method further comprising one or more of the processes of inter-cluster network formation, inter-cluster network maintenance, and inter-cluster communication.

44. A method as in claim 43, wherein the network further comprises a designated device and the process of inter-cluster network formation comprises:
the designated device sending a HELLO message to neighboring nodes;
if a cluster head of the plurality of cluster heads receives the HELLO message:
the designated device assigning a cluster identifier to the cluster head; and
the cluster head informing its member nodes of the cluster identifier; and
if a member node receives the HELLO message:
the member node adding the cluster identifier of the neighboring node from the parent cluster to its neighbor list;
the member node reporting the neighbor list to the cluster head;
the cluster head designating the member node as a border node; and
the designated device assigning a cluster identifier to the cluster head via the border node.

45. A method as in claim 44, wherein the designated device assigning a cluster identifier to the cluster head comprises:
the cluster head sending a CONNECTION REQUEST message to the designated device;
the designated device sending a CONNECTION RESPONSE message to the cluster head;
the cluster head sending an ACK message to the designated device;
the cluster head sending an CLUSTER IDENTIFIER REQUEST message to the designated device; and
the designated device sending a CLUSTER IDENTIFIER RESPONSE message to the cluster head.

46. A method as in claim 44, wherein the designated device assigning a cluster identifier to the cluster head via the border node comprises:
the cluster head sending a NETWORK CONNECTION REQUEST message to the border node;
the border node sending a CONNECTION REQUEST message to the designated device, or to its parent node that belongs to the parent cluster;
the designated device, or the parent node from the parent cluster, sending a CONNECTION RESPONSE message to the border node;
the border node sending an ACK message to the designated device, or to the parent node from the parent cluster;
the border node sending an CLUSTER IDENTIFIER REQUEST message to the designated device;
the designated device sending a CLUSTER IDENTIFIER RESPONSE message to the border node; and
the border node sending a NETWORK CONNECTION RESPONSE message to the cluster head.

47. A method as in claim 43, wherein a node of the plurality of nodes is a designated device and the process of inter-cluster network formation comprises:
each cluster head in the plurality of nodes periodically sending a LINK STATE REPORT to the designated device;
the designated device calculating a tree route for the network; and
the designated device sending a NETWORK TOPOLOGY UPDATE message to each cluster head.

48. A method as in claim 47, wherein the process of inter-cluster network formation further comprises each cluster head updating a list of identifiers of parent clusters, child/lower clusters and border nodes when a NETWORK TOPOLOGY UPDATE message is received.

49. A method as in claim 44, wherein the cluster head requests a cluster identifier from the designated device via at least one of an intermediate cluster head and a border node.

50. A method as in claim 44, wherein the designated device assigns a cluster identifier to a cluster head via at least one of an intermediate cluster head and a border node.

51. A method as in claim 47, wherein a node of the plurality of nodes is a backup designated device and the process of inter-cluster network maintenance further comprises the backup designated device periodically duplicating the list of cluster ID and network link-state information of the designated device.

* * * * *